US010067225B1

(12) United States Patent
Sentelle et al.

(10) Patent No.: US 10,067,225 B1
(45) Date of Patent: Sep. 4, 2018

(54) GATED CONTINUOUS WAVE RADAR

(71) Applicant: L-3 Communications Security and Detection Systems, Inc., Woburn, MA (US)

(72) Inventors: Christopher Gary Sentelle, Orlando, FL (US); Jeffery Carter May, Cocoa, FL (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 476 days.

(21) Appl. No.: 14/825,814

(22) Filed: Aug. 13, 2015

Related U.S. Application Data (60) Provisional application No. 62/037,958, filed on Aug. 15, 2014.

(51) Int. Cl.
*G01S 13/88* (2006.01)
*G01S 7/35* (2006.01)

(52) U.S. Cl.
CPC .............. *G01S 13/885* (2013.01); *G01S 7/35* (2013.01)

(58) Field of Classification Search
CPC ..................................................... G01S 13/885
USPC ............................................................ 342/22
See application file for complete search history.

(56) References Cited

U.S. PATENT DOCUMENTS

| 8,884,807 | B1 * | 11/2014 | Johansson | ............. G01S 13/885 342/175 |
| 2003/0090406 | A1 * | 5/2003 | Longstaff | ............ G01S 13/0209 342/22 |

* cited by examiner

*Primary Examiner* — Peter M Bythrow
*Assistant Examiner* — Helena H Seraydaryan
(74) *Attorney, Agent, or Firm* — Fish & Richardson P.C.

(57) ABSTRACT

Methods, systems, and apparatus for transmitting a first set of continuous wave (CW) signals, where each CW signal of the first set of CW signals has a first signal frequency and the transmitter is turned off between transmission of each CW signal of the first set of CW signals. For each CW signal of the first set of CW signals, receiving a reflection of the CW signal, and selecting an analog to digital (A/D) sample of the reflection of the CW signal that does not contain ground reflections by selecting the A/D sample based on timing from the transmitter being turned off after transmission of the CW signal. Integrating the selected A/D samples from each of the CW signals of the first set of CW signals to obtain a single A/D sample for the first set of CW signals.

20 Claims, 6 Drawing Sheets

GATED CONTINUOUS WAVE RADAR

CROSS-REFERENCE TO RELATED APPLICATIONS

This application claims the benefit of U.S. Provisional Patent Application No. 62/037,958, filed Aug. 15, 2014, the entirety of which is hereby incorporated by reference as if fully set forth therein.

TECHNICAL FIELD

This disclosure relates to ground penetrating radar and metal detection.

SUMMARY

In general, innovative aspects of the subject matter described in this specification can be embodied in methods that include actions of transmitting a first set of continuous wave (CW) signals, where each CW signal of the first set of CW signals has a first signal frequency and the transmitter is turned off between transmission of each CW signal of the first set of CW signals. For each CW signal of the first set of CW signals, receiving a reflection of the CW signal, and selecting an analog to digital (A/D) sample of the reflection of the CW signal that does not contain ground reflections by selecting the A/D sample based on timing from the transmitter being turned off after transmission of the CW signal. Integrating the selected A/D samples from each of the CW signals of the first set of CW signals to obtain a single A/D sample for the first set of CW signals. Other implementations of this aspect include corresponding systems and devices configured to perform the actions of the methods. Other implementations can include computer programs encoded on a computer readable storage medium.

These and other implementations can each optionally include one or more of the following features. The method can include transmitting a second set of CW signals, where each CW radar signal of the second set of CW signals has a second signal frequency different from the first signal frequency, and where the transmitter is turned off between transition of each CW signal of the second set of CW signals. For each CW signal of the second set of CW signals receiving a reflection of the CW signal, and selecting an analog to digital (A/D) sample of the reflection of the CW signal that does not contain ground reflections by selecting the A/D sample based on timing from the transmitter being turned off after transmission of the CW signal. Integrating the selected A/D samples from each of the CW signals of the second set of CW signals to obtain a single A/D sample for the second set of CW signals.

The method can include, for each CW signal of the first set of CW signals, switching a receiver off during transmission of the CW signal. The CW signals in the first set of CW signals can be transmitted in 70 ns intervals. Selecting an A/D sample of the reflection of the CW signal can include shifting a phase of a clock signal for an A/D converter to permit sub-simple resolution for timing the selection of the selected A/D sample. The timing can be based on a fixed time delay. The time delay can be based on estimating a distance of a GPR head from the ground. The A/D samples can be obtained from a pipeline A/D converter. A sample rate of the A/D samples can be one giga-samples per second (1 Gsps).

In a second general aspect, the subject matter described in this specification can be embodied in methods that include actions of obtaining a first set of A/D samples of a transmitted CW signal. Obtaining a second set of A/D samples of reflections of the transmitted CW signal. Determining a time that transmission of the transmitted CW signal stops based on the first set of A/D samples. Selecting an A/D sample from the second set of A/D samples that does not contain ground reflections of the transmitted CW signal based on the time that the transmission of the CW signal stops and a delay period. Other implementations of this aspect include corresponding systems and devices configured to perform the actions of the methods. Other implementations can include computer programs encoded on a computer readable storage medium.

These and other implementations can each optionally include one or more of the following features. The method can include: determining a second time that transmission of the transmitted CW signal stops based on the first set of A/D samples; electing a second A/D sample from the second set of A/D samples that does not contain ground reflections of the transmitted CW signal based on the second time that the transmission of the CW signal stops and the delay period; and integrating the A/D sample and the second A/D sample.

The delay period can be based on the distance of a GPR head from the ground. The A/D samples can be obtained from a pipeline A/D converter. A sample rate of the A/D samples can be 1 Gsps. The delay period can be based on estimating a distance of a GPR head from the ground.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The techniques discussed below can be employed to improve the performance of stepped-frequency continuous wave (SFCW) ground penetrating radar (GPR) detectors and continuous wave metal detectors (CWMD). Implementations of the present disclosure will be discussed in further detail with reference to GPR detectors, however, they can also be applied to CWMDs. Specifically, the implementations of the present disclosure will be discussed with respect to stepped-frequency continuous wave (SFCW) GPR detectors. GPR detectors and metal detectors are used to detect buried objects. To detect buried objects, the radar system transmits signals that pass through the ground and reflect off of buried objects. The GPR detector detects objects by analyzing the return signals. GPR detectors can further process the return signals to determine various characteristics of an object such as, for example, the depth of the object, object type, and/or material of the object. Often, however, target objects (e.g., mines) are obscured by ground reflections. That is, the radar signals reflect off of the air/ground interface. The ground reflections can interfere with reflections from buried objects effectively masking potential targets.

GPR detectors may transmit sets of SFCW signals in frame periods. During each frame period CW signals are sequentially transmitted at each frequency step defined by the GPR. The GPR detector sequentially samples the reflections of each of the transmitted signals, for example, obtaining one analog-to-digital (A/D) sample at each frequency. GPR detectors analyze the A/D samples across the transmitted frequencies to detect and identify buried targets. For example, a GPR can perform an inverse fast-Fourier transform (IFFT) on the A/D samples across a set of stepped frequencies in each frame. In some examples, targets may be detected based on target signatures in the results of the IFFTs.

In some examples, however, target signatures may be masked by reflections of the radar signals off of the ground. The ground reflections can be removed by gating a GPR receiver. That is, the GPR receiver can be turned off during the transmission of each CW signal, and the GPR can delay turning the receiver on until after the ground reflection have propagated past the receiver. However, because the distances involved in detecting buried objects are relatively short (e.g., GPR detector heads are only a few inches above the ground and objects are generally buried only few inches or feet below the surface), gating the receiver requires high speed and precise gating. For example, the gating speed may be in the gigahertz (GHz) and the timing precision to the nanosecond. Moreover, high speed gating can introduce excess switching noise and require large instantaneous bandwidth (e.g., 250 MHz-1 GHz video bandwidth) to process the signal returns.

Implementations of the present disclosure may remove ground reflections from GPR signals while minimizing the noise due to high speed gating. For example, multiple gated analog to digital (A/D) samples (e.g., 100, 500, 1000, or some other number) of CW signal reflections may be obtained for each frequency in the set of stepped frequencies of a radar frame. The multiple A/D samples of CW signal reflections for a given frequency can be integrated to obtain a single A/D sample at the given frequency. More specifically, for example, during each frame, a GPR system may consecutively transmit signals at each of a number of different frequencies (e.g., 140 different frequencies). The GPR system may step to a new frequency after a given period of time (e.g., 70 µs). Thus, each frequency in a frame may be processed during a frequency window (e.g., 70 µs). In addition, multiple (e.g., 100, 500, 1000) "gating cycles" can be performed during the frequency window of each particular frequency per frame. During a gating cycle the CW signal can be transmitted, the receiver gated, and signal reflections sampled. For example, each gating cycle can be performed during a 70 ns interval if 1000 gating cycles are performed during each frequency window. The sampled reflections at a given frequency (e.g., the samples obtained during the frequency window for one signal frequency) can be integrated to obtain a single return sample for each frequency window. That is, at the completion of a radar frame, the system will obtain one integrated signal return sample at each of the stepped frequencies of the frame. In some examples, the integration gain obtained by integrating the returns signals across multiple gating cycles may reduce the noise caused by the high speed gating and thereby countering the effects of a large instantaneous bandwidth.

The techniques discussed below may improve detection capabilities of GPR and CWMD systems. Features may improve overall performance of GPR systems and CWMD systems by increasing the ability to distinguish between target objects and buried clutter. Features may provide improved detection of both shallow and deep targets.

Figure 1A:
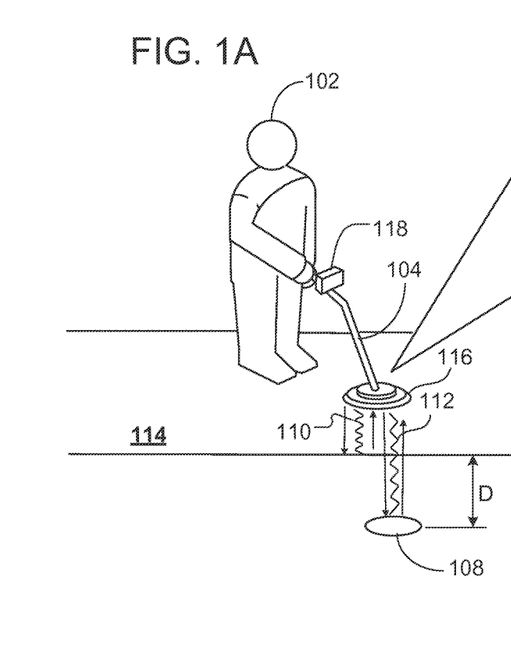
FIG. 1A shows an example of a ground penetrating radar (GPR) device operated by a user.

FIG. 1A shows an example of a GPR device 104 operated by a user 102. The GPR device 104 may be referred to as a SFCW radar. In operation, the device 104 generates electromagnetic signals 110, 112, which are directed, by a detector head 116, towards the ground 114 to detect objects buried objects 108. The device 104 detects reflections of the transmitted signals 110, 112, from both objects 108 and the ground 114. In some cases, reflections form the ground 114 can mask reelections form the buried object 108.

Figure 1B:
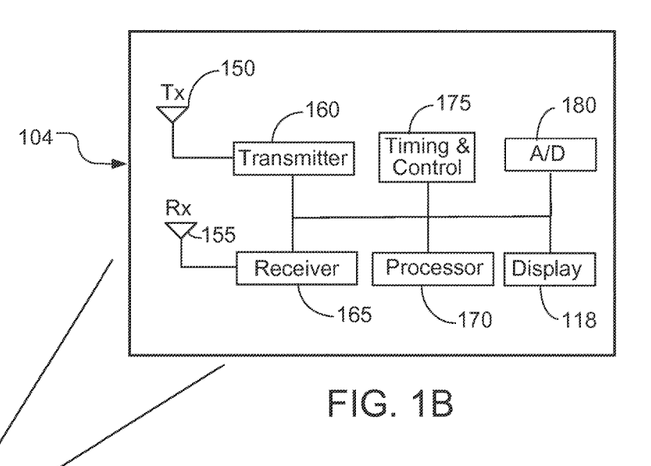
FIG. 1B shows a block diagram of on an example GPR device.

FIG. 1B shows a block diagram of on an example GPR device 104. The GPR device 104 may be used in any of the examples discussed herein. The device 104, which may be a handheld stepped-frequency GPR scanner or a CWMD, includes antennas 150 and 155 for transmitting and receiving a stepped-frequency radio frequency signal (an "RF signal"). The antennas 150 and 155 are housed in the detector head 116. Although in this example, the device 104 is hand-held, in other examples, the device 104 may be vehicle-mounted or mounted on a push-cart.

The device 104 is shown as a bistatic radar system, in that there are separate antennas for transmitting and receiving the RF signal. In particular, the antenna 150 is connected to a radar transmitter and transmits an RF signal toward a target, and the antenna 155 is connected to a radar receiver and receives a portion of the RF signal that is reflected by the target. In another implementation, device 104 may be a monostatic radar system that uses a single antenna to transmit and receive the RF signal. The following discussion assumes that the antenna 150 is the transmitting antenna and the antenna 155 is the receiving antenna.

The transmit antenna 150 is connected to a radar transmitter 160 that transmits RF signals toward a target. The RF signals include a set of frequencies that cover a bandwidth in increments of frequency steps. All of signals in a set of signals may be transmitted and received during respective frequencies windows of a radar frame. For example, during one radar frame, one hundred forty RF signals may be transmitted and received. The signals may range from 0.4 GHz to 8.0 GHz in steps of 55 MHz. The number of signals transmitted and received may, in some examples, be limited by a desired frame rate for the device 104. For example, in order to adequately receive, process, and display information related to buried objects to a user in a relevant time period, the device 104 may be required to refresh the displayed data at a predetermined frame rate (e.g., 100 Hz).

The receive antenna 155 is connected to a radar receiver 165 and receives the reflected RF signals from the target. For simplicity, the receive antenna 155 is discussed in terms of the implementation including a single antenna. Nevertheless, the receive antenna 155 may represent two or more antennas. In some examples, the receive antenna 155 can be mechanically or electronically gated. That is, the receive antenna 155 can be connected and disconnected from the receiver (e.g., turned "on" and "off") automatically.

Implementations employing multiple antennas may each have a dedicated receiver or may share the receiver 165. The receiver 165 is coupled to an A/D converter 180. The A/D converter 180 converts the received analog signals into digital signals. In some examples, the A/D converter 180 can be a pipeline A/D converter. In some examples, the A/D converter 180 can be a one gigasample per second (1 Gsps) A/D converter. In some implementations, the A/D converter 180 can operate, for example, between 100 Msps and 1 Gsps. In implementations, the transmitter is also coupled to the same or another A/D converter 180.

The receiver 165 and A/D converter 180 are coupled to a processing system 170 that processes received RF signals from the receiving antenna 155. The processing system 170 can be any type of one or more electronic processors, and the processing system includes an electronic storage (not shown) that stores instructions that, when executed cause the electronic processor to process, manipulate, or analyze data from the receiver 165. In addition, the processing system 170 cooperates with the transmitter 160 and receiver 165 to control signal gating. For example, as discussed in more detail below, the processing system 170 can adjust transmit and receive timing to remove interference caused by ground reflections. In addition, the processing system 170 can integrate sample data to reduce high speed gating noise, and thereby counter the effects of a high instantaneous bandwidth. In some examples, the processing system 170 can evaluate signal return data to detect ground reflections and determine appropriate timing for receiver gating.

The signal processing system 170 is coupled to a display 118 and a timing and control module 175. The display 118 provides an audible and/or a visual alert when an object is detected by the scanner. The timing and control module 175 may be connected to the transmitter 160, the receiver 165, the signal processor 170, and the display 118. The timing and control module provides signals, such as a clock signal and control signals, to the other components of the device 104.

In some examples, the GPR device 104 may include ground sensors to detect the distance from the detector head 116 to the ground 114. For example, the ground sensors can include, but are not limited to, optical sensors, laser sensors (e.g., laser range finder), inertial sensors, or any other appropriate distance sensor.

Figure 2:
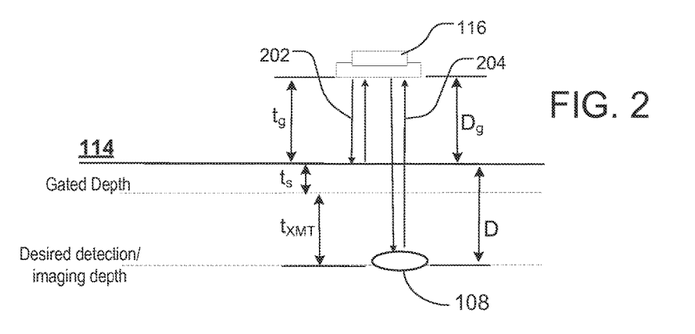
FIG. 2 shows a graphical representation of the ground reflections from an example GPR device.

FIG. 2 shows a graphical representation of the ground reflections from an example GPR device. The detector head 116 is illustrated a distance ($D_g$) above the ground 114, and an object 108 is buried a distance (D) below the ground 114. When radar signals are transmitted by the antenna in the detector head 116, the signals reflect off of both the ground 114 (i.e., air/ground interface) and buried objects 108. The ground reflections are represented by arrows 202 and the object (target) reflections are represented by arrows 204.

The timing for GPR signal gating and sampling is based on three time intervals. The ground reflection time ($t_g$), receiver switching time ($t_s$) (e.g., receiver gate transient time), and the transmit on-time ($t_{xmt}$). The ground reflection time ($t_g$) is the round trip time for a signal to reflect off of the ground 114 and return to the detector head. This is the time that a GPR device waits after transmitting a signal in order to effectively gate out ground reflections by allowing ground reflections to propagate past the detector head 116. The ground reflection time ($t_g$) is dependent on the distance of the detector head 116 from the ground 114 ($D_g$). In some examples, the GPR device can use a distance sensor located in the detector head 116 to determine the distance to the ground and calculate the ground reflection time ($t_g$).

The receiver switching time ($t_s$) is a finite amount of time required to turn a receiver on before signals can be effectively received. The receiver switching times ($t_s$) governs a time delay between the ground reflections and reflections at a minimum receivable depth (e.g., the desired gating depth). Faster receiver switching times ($t_s$) allow for operations closer to the ground 114 and detection of shallower targets (e.g., a shallower minimum receivable depth).

The transmit on-time ($t_{xmt}$) represents the period of time that the transmitter remains on in order to detect/image objects at a desired depth. As described in more detail below, implementations of the present disclosure can trigger receiver gating off of the end of the transmit on-time ($t_{xmt}$) (e.g., the transmitter shutting off). Therefore, by using the transmit on-time ($t_{xmt}$) to control the detection/imaging depth of a GPR device, the timing for receiver gating can be independent or nearly independent of changes to detection/imaging depth of the system. In other words, the receiver gating timing may be relatively agnostic to the transmit on-time ($t_{xmt}$) and adjustments made to GPR signals to detect targets at different depths (e.g., deeper or shallower targets).

Figure 3A:
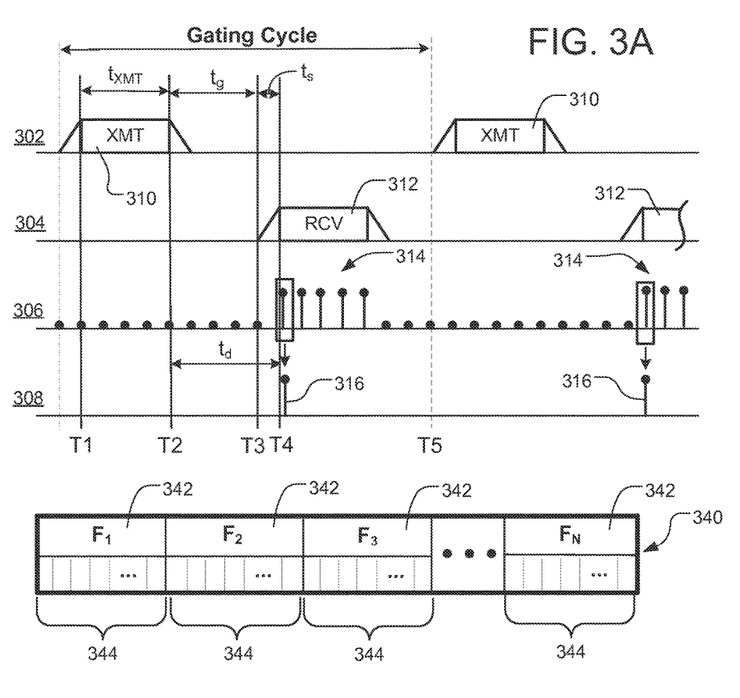
FIGS. 3A-3B depict example timing diagrams of radar signal gating.
Figure 3B:
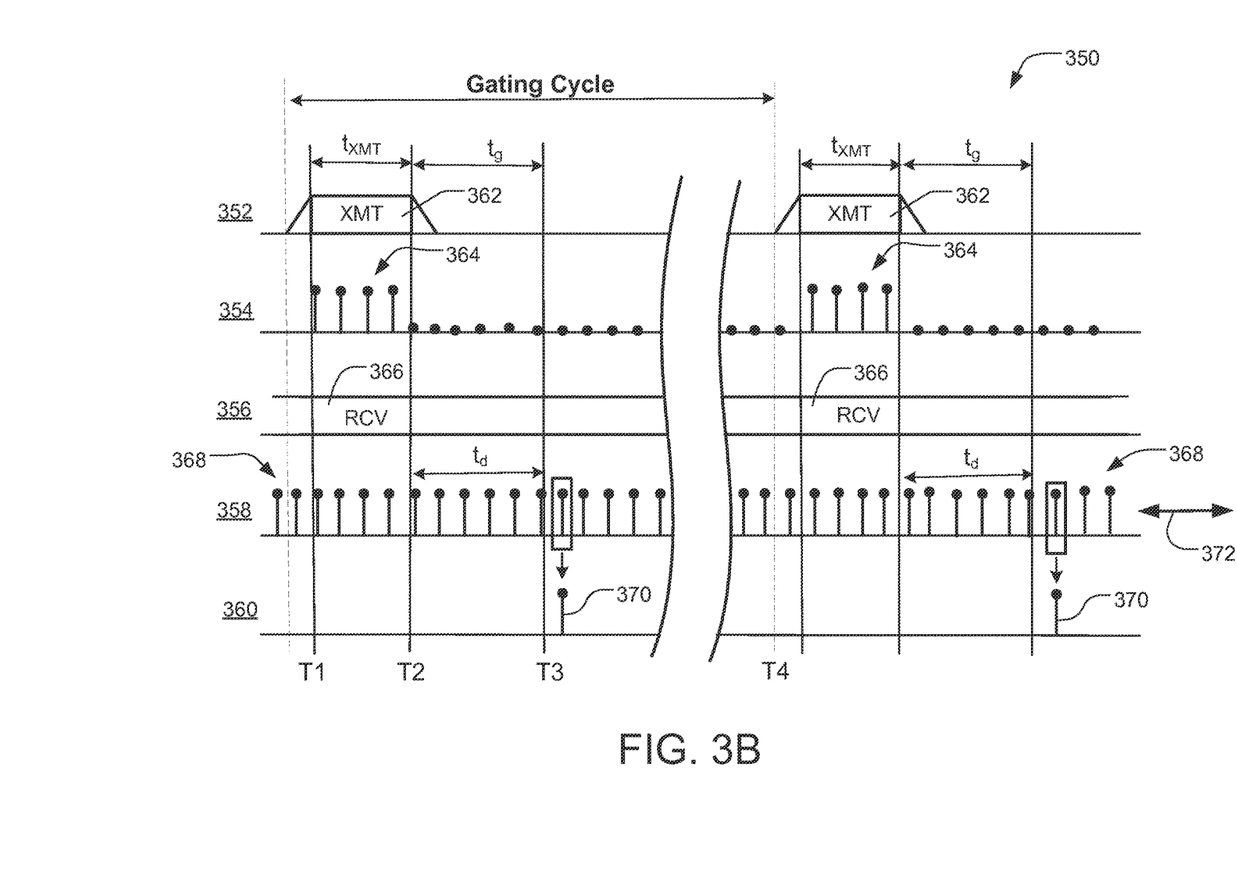

FIGS. 3A-3B depict example timing diagrams (300 and 350) of example GPR signal gating processes. The timing diagrams (300 and 350) each depict two gating cycles of example GPR signal gating processes. As noted above a gating cycle includes transmitting a CW signal, gating the received signal, and sampling the received (reflected) signal. Moreover, a plurality of gating cycles (e.g., 100, 500, 1000, 1500) can be performed during each frequency window. For example, as illustrated in the graphical representation of a radar frame 340 in FIG. 3A, during each radar frame, a GPR system consecutively transmits signals at each of a number of different stepped frequencies (e.g., frequencies $F_1$-$F_N$). Each frame 340 can, thus, include a plurality of frequency windows 342 during which signals of one of the frequencies ($F_1$-$F_N$) are transmitted. A plurality of gating cycles 344 can be performed at each frequency during respective frequency windows 342. For reference, in an example GPR device, a frame 340 may be approximately 10 ms long, each of the frequency windows 342 (e.g., 140) may be approximately 70 µs long, and each of the gating cycles 344 (e.g., 1000) may be approximately 70 ns long.

FIG. 3A illustrates an example timing diagram 300 depicting a gating cycle of a first example GPR signal gating process. Timeline 302 represents the time that the transmitter 310 is on (e.g., transmitting a signal), timeline 302 represents the time that the receiver 312 is on (e.g., receiving signals), timeline 306 shows A/D samples 314 of received signals correlating to time that the receiver 312 is on, and timeline 308 illustrates selected A/D samples 316. At time T1, the transmitter 310 is turned on and begins transmitting a CW signal for the transmit on-time ($t_{xmt}$). As illustrated, the transmit on-time ($t_{xmt}$) does not include switching time (e.g., the finite period of time required for a transmitter to be turned on or off) of the transmitter as represented by the slanted lines. At time T2, the transmitter 310 is switched off.

The GPR device estimates the ground reflection time ($t_g$), for example, by sensing the distance from the detector head to the ground and calculating the ground reflection time ($t_g$) based on the sensed distance. The GPR device delays switching the receiver 312 on for a period of time ($t_g$) approximately equal to the estimated ground reflection time ($t_g$). At time T3, after the ground reflection time ($t_g$) delay, the GPR device switches the receiver 312 on. The period between time T3 and time T4 represents the receiver switching time ($t_s$), which is a finite amount of time required for a receiver to be switched on before signals can be effectively received.

The GPR device selects one or more of the A/D samples 314 of the received signals after time T4. In other words, the GPR device ignores the A/D samples 314 from the time that the transmitter is turned on (time T1) through the completion of the receiver switching time ($t_s$) (time T4). In some examples, the GPR device selects the one or more A/D samples 314 immediately after the receiver switching time (ts) (time T4). The gating cycle ends when the transmitter is switched back on to transmit the CW signal again (time T5). The gating cycle is repeated a plurality of times for each CW signal frequency (e.g., during a frequency window 342). The selected A/D samples 316 from each of the gating cycles for a CW signal frequency are integrated to obtain a single sample for the respective frequency window. Integrating the selected A/D samples 316 may result in integration gain, and thereby, increase the signal to noise ratio (SNR) of the integrated sample over that of any of the individual A/D samples 316.

In some implementations, the gating timing to switch the receiver 312 on (time T3) following the transmission of a CW signal is triggered based on switching the transmitter 310 off (e.g., time T2). For example, the receiver 312 can be automatically switched on by the GPR after a delay period approximately equal to the estimated ground reflection time ($t_g$) and the A/D samples 314 can be continuously generated by an A/D converter regardless of whether the receiver is on or off. In some implementations, the gating timing can be used to synchronize an A/D converter with the transmitter 310. For example, following the transmission of a CW signal an A/D converter can be triggered to turn on after a delay period ($t_d$) based on switching the transmitter 310 off (e.g., time T2). For example, the GPR can turn the A/D converter on after waiting for a delay period ($t_d$) approximately equal to the estimated ground reflection time ($t_g$) and the receiver switching time ($t_s$). In some examples, the A/D converter may operate continuously and the delay period ($t_d$) can be used to determine which A/D sample 316 to select.

In some implementations, the estimated ground reflection time ($t_g$) can be estimated empirically. For example, the GPR can occasionally or regularly leave the receiver 312 on during transmission of the CW signals and analyze the A/D samples 368 of the received signal prior to time T4 to identify the ground reflections. The GPR can use the identified ground reflections to more precisely determine when the reflected waves have propagated past the detector head and adjust the estimated ground reflection time ($t_g$) accordingly.

FIG. 3B illustrates an example timing diagram 350 depicting a gating cycle of a second example GPR signal gating process. Timeline 352 represents the time that the transmitter 362 is on (e.g., transmitting a signal), timeline 354 shows A/D samples 364 of the transmitted signal, timeline 356 represents the time that the receiver 366 is on (e.g., receiving signals), timeline 358 shows A/D samples 368 of received signals, and timeline 360 illustrates selected A/D samples 370. At time T1, the transmitter 310 is turned on and begins transmitting a CW signal for the transmit on-time ($t_{xmt}$). As illustrated, the transmit on-time ($t_{xmt}$) does not include switching time (e.g., the finite period of time required for a transmitter to be turned on or off) of the transmitter as represented by the slanted lines. At time T2, the transmitter 310 is switched off. In the second example GPR signal gating process, the GPR obtains A/D samples 364 of the transmitted signal (timeline 354), and maintains the receiver 366 A/D converter on (timeline 356). For example, the output of the transmitter (e.g., the transmitted signals) can be provided to an A/D converter that monitors the transmitter signals. The A/D samples 364 of the transmitted signals will drop to zero (or near zero) when the transmitter 362 is turned off (time T2). The GPR can use the A/D samples 364 of the transmitted signal as basis for performing digital gating of the A/D samples 368 of the received signals (timeline 358).

The GPR device estimates the ground reflection time ($t_g$), for example, by sensing the distance from the detector head to the ground and calculating the ground reflection time ($t_g$) based on the sensed distance. The GPR device delay's selecting an A/D sample 368 of the received signals for a period of time ($t_g$) approximately equal to the estimated ground reflection time ($t_d$). At time T3, after the ground reflection time ($t_g$), the GPR device selects an A/D sample 370 from the A/D samples 368 of the received signals. Because the GPR delays selecting an A/D sample until after the estimated ground reflection time ($t_d$), the selected A/D sample 370 does not include ground reflections. In some examples, the receiver is switched off (e.g., during the transmitter's transmit time ($t_{xmt}$)) to prevent the receiver from becoming saturated or compressed from the leakage and, in some cases, the ground return signals. However, receiver gating may not be necessary if, for example, the receiver amplifiers do not become saturated or compressed, or if the receiver has a sufficiently fast recovery time once compressed so as to recover before signal reflections from target objects are received.

In addition, even though a 1 Gsps A/D converter has a 1 ns inter-sample time, in some implementations, more precision in selecting the sample(s) 370 after the transmitter has turned off may be needed. In such implementations, more precise timing in selecting sample(s) 370 can be obtained by phasing a clock for the A/D converter to allow sub-sample timing alignment relative to transmit gate timing. In other words, the A/D sample timing may be shifted left or right (as shown by arrow 372 in FIG. 3B) by shifting the phase of the A/D converter clock.

The gating cycle ends when the transmitter is switched back on to transmit the CW signal again (time T4). The gating cycle is repeated a plurality of times for each CW signal frequency (e.g., during a frequency window 342 of FIG. 3A). In some implementations, the selected A/D samples 370 from each of the gating cycles for a CW signal frequency are integrated to obtain a single sample for the respective frequency window. Integrating the selected A/D samples 370 may result in integration gain, and thereby, increase the signal to noise ratio (SNR) of the integrated sample over that of any of the individual A/D samples 370.

In some implementations, estimated ground reflection time ($t_d$) can be estimated empirically. For example, because the receiver 366 is not switched on and off, the GPR can analyze the A/D samples 368 of the received signal to identify the ground reflections. The GPR can use the identified ground reflections to more precisely determine when the reflected waves have propagated past the detector head and adjust the estimated ground reflection time ($t_d$) accordingly.

Figure 4A:
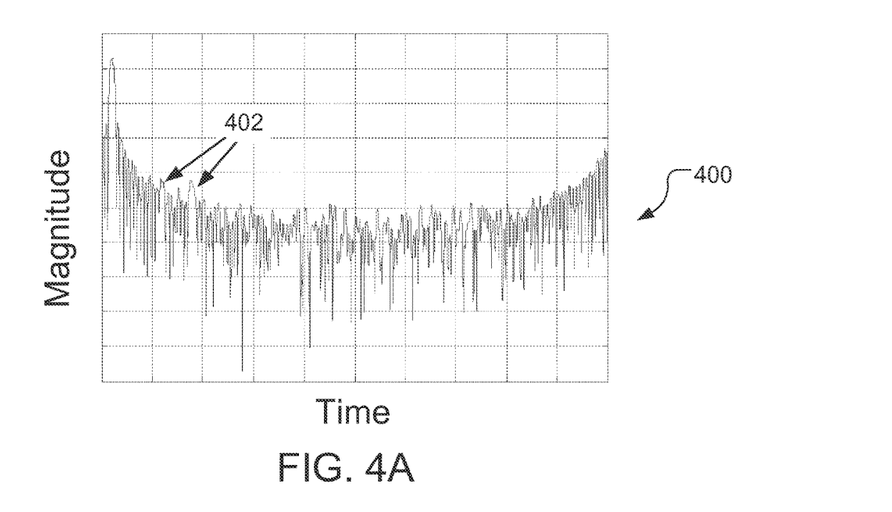
FIGS. 4A and 4B depict example data from an example GPR device.
Figure 4B:
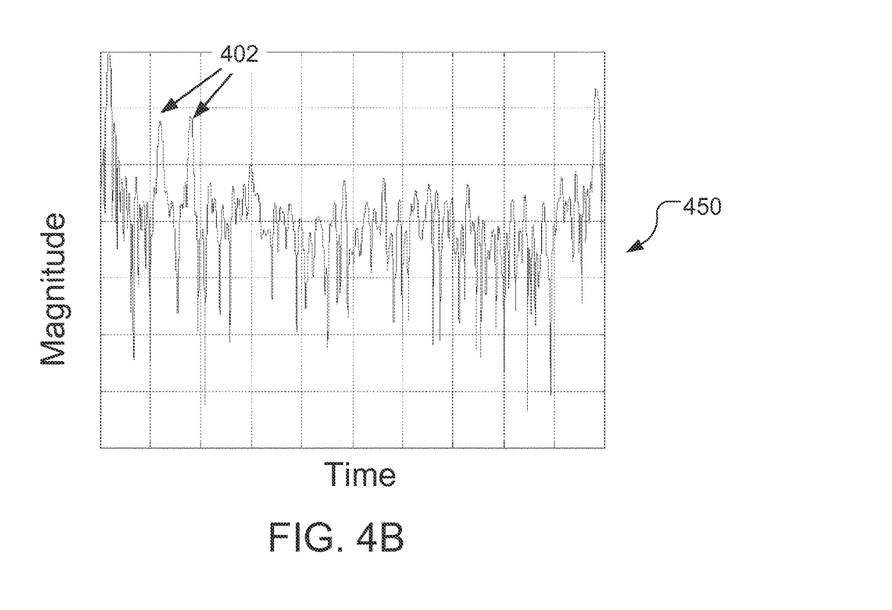

FIGS. 4A and 4B depict example data from an example GPR device. Graph 400 shows IFFT data from target reflections of GPR transmitted signals. The data in graph 400 represents IFFT data from ungated GPR samples. That is, the data includes ground reflections. As depicted in graph 400, weak targets 402 are masked when the received signals include ground reflections. Graph 450 also shows IFFT data from target reflections of GPR transmitted signals. However, the data in graph 450 represents data from a GPR device gated in accordance with implementations of the present disclosure. In the gated data of graph 450 the weak targets are no longer masked by ground reflections and are more discernable in the IFFT of the received signals.

Figure 5:
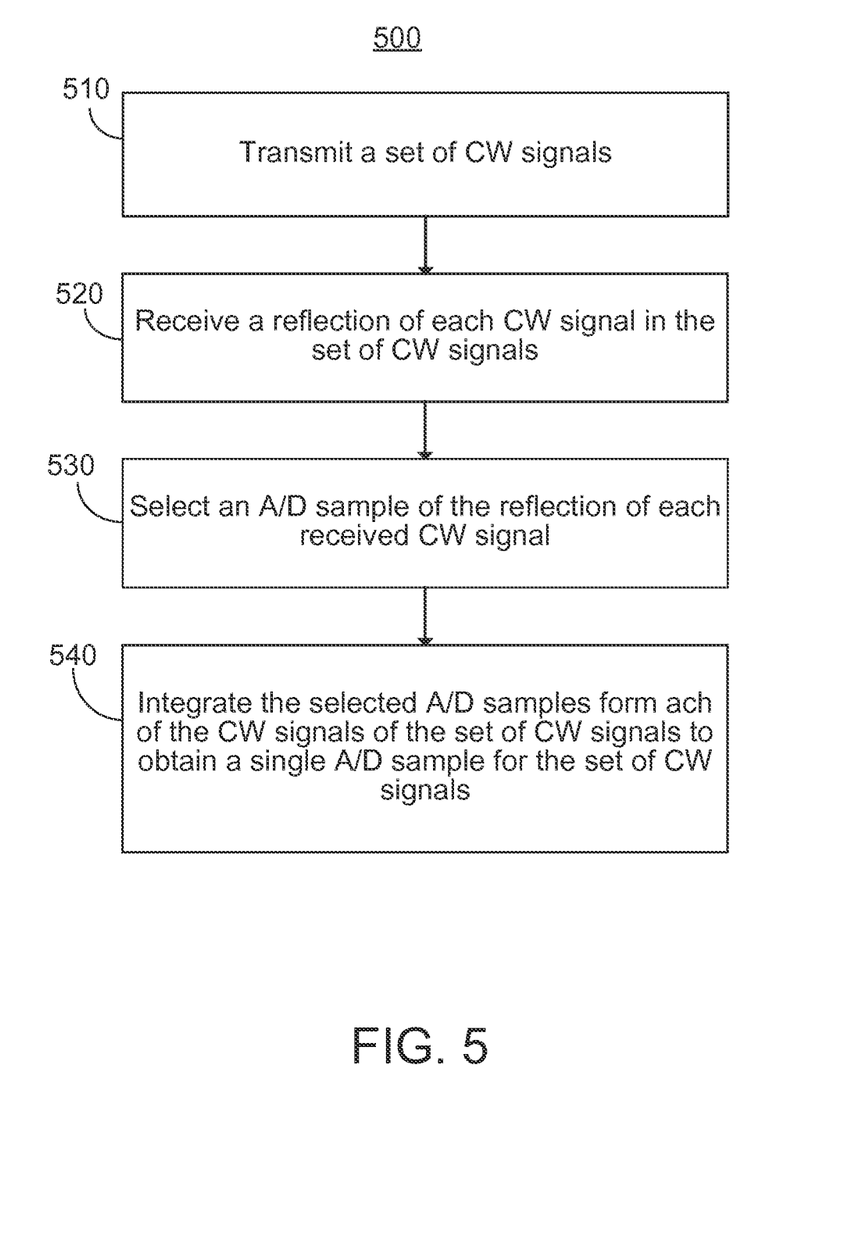
FIGS. 5 and 6 are flow charts illustrating an example of a processes for operating a GPR device.

FIG. 5 is a flow chart illustrating an example of a process 500 for operating a GPR device. The process 500 may be carried out on the GPR device shown in FIGS. 1A and 1B as discussed above. The process begins by transmitting a set of CW signals (510). Each CW signal in the set of CW radar signals has the same signal frequency. For example, each of the CW signals may be transmitted during the same frequency window. In addition, the transmitter is turned off between the transmission of each CW signal of the set of CW signals. For example, cycling the transmitter on and off may define a gating cycle for the GPR device. For each CW signal of the set of CW radar signals: a reflection of the CW radar signal is received (520), and an analog to digital (A/D) sample of the reflection of the CW radar signal is selected (530). For example, the GPR receiver may be off for a predetermined delay period after the transmitter is turned on. In other words, the GPR receiver may not be turned on for a predetermined delay period after the transmitter completes transmitting a CW signal. The predetermined delay period can account for an estimated time for the transmitted CW signal to reflect off of the air/ground interface and propagate past the GPR detector (e.g., a ground reflection time), so as to ignore ground reflections. Selecting an A/D sample of the reflected CW signal may include waiting for an additional predetermined delay period (e.g., a receiver switching time) from turning on the receiver before selecting an A/D sample of the received CW signal. The selected A/D samples from each of the CW signals of the set of CW signals are integrated to obtain a single A/D sample for the set of CW signals (540). For example, during a frequency window, a GPR may perform a plurality of gating cycles (e.g., 100, 500, 1000, or more gating cycles), and can integrate A/D samples from each of the gating cycles to obtain a single A/D sample for the respective frequency window. The process 500 can be repeated for each signal frequency in a SFCW radar frame to obtain an A/D sample of reflected CW signals for each signal frequency.

Figure 6:
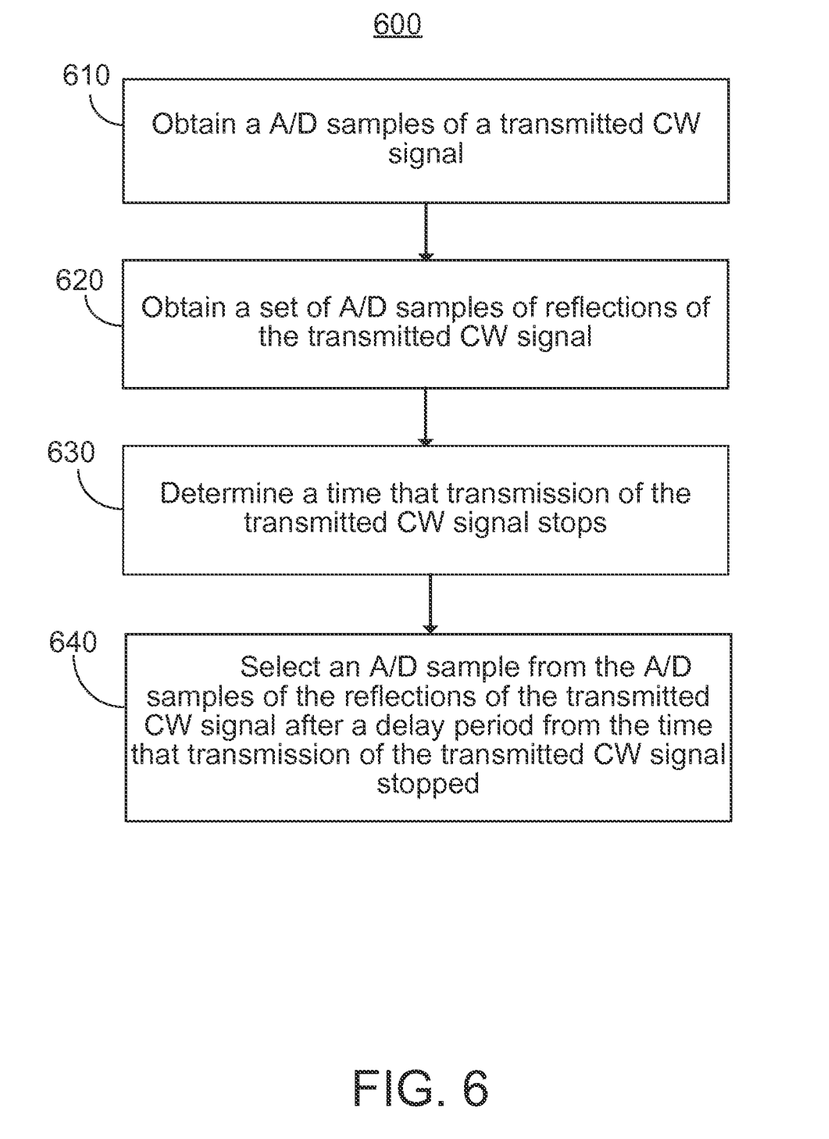

FIG. 6 is a flow chart illustrating an example of a process 600 for operating a GPR device. The process 600 may be carried out on the GPR device shown in FIGS. 1A and 1B as discussed above. The process begins by obtaining a set of A/D samples of a transmitted CW signal (610). For example, an A/D converter can be coupled to a GPR transmitter and monitor transmitted CW signals. The GPR device obtains a set of A/D samples of reflections of the transmitted CW signal is obtained (620). For example, the GPR receiver can be continuously on, and receive reflections of the transmitted CW signal. The received reflections can be converted to A/D samples by an A/D converter. A time that transmission of the transmitted CW signal stops is determined (630). For example, the time that transmission of the transmitted CW signal stopped can be determined from the set of A/D samples of a transmitted CW signal. An A/D sample from the A/D samples of the reflections of the transmitted CW signal is selected after a delay period from the time that transmission of the transmitted CW signal stopped (640). For example, an A/D sample can be selected based on a predetermined delay time from the time that the transmission of the CW signal stopped. The predetermined delay period can account for an estimated time for the transmitted CW signal to reflect off of the air/ground interface and propagate past the GPR detector (e.g., a ground reflection time), so as to ignore A/D samples containing ground reflection signals.

In some implementations, the process 600 can be performed during a gating cycle of a GPR. In addition, the process 600 can be repeated a plurality of times (e.g., during 100, 500, 1000, or more gating cycles) for each CW signal frequency in a set of SFCW signals (e.g., during respective frequency windows). In some implementations, the selected A/D signals from each gating cycle of a respective frequency window can be integrated to obtain a single A/D sample for the respective frequency window.

The operations described in this specification can be implemented as operations performed by a processing system on data stored on one or more computer-readable storage devices or received from other sources. The term "processing system" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, an operating system.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

To provide for interaction with a user, implementations of the subject matter described in this specification can be implemented on a detecting device having a display, for example, a CRT (cathode ray tube) or LCD (liquid crystal display) monitor, for displaying information to the user and a keyboard and a pointing device (e.g., touch screen or a trackball) by which the user can provide input to the detecting device.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for operating a stepped frequency continuous wave (SFCW) ground penetrating radar (GPR), the method comprising:
   transmitting, by a transmitter, a first set of continuous wave (CW) signals, each CW signal of the first set of CW signals having a first signal frequency, and the transmitter being turned off between transmission of each CW signal of the first set of CW signals;
   for each CW signal of the first set of CW signals:
      receiving a reflection of the CW signal, and
      selecting an analog to digital (A/D) sample of the reflection of the CW signal that does not contain ground reflections by selecting the A/D sample based on timing from the transmitter being turned off after transmission of the CW signal; and
   integrating the selected A/D samples from each of the CW signals of the of the first set of CW signals to obtain a single A/D sample for the first set of CW signals.

2. The method of claim 1, further comprising:
   transmitting, by the transmitter, a second set of CW signals, each CW radar signal of the second set of CW signals having a second signal frequency different from the first signal frequency, and the transmitter being turned off between transition of each CW signal of the second set of CW signals;
   for each CW signal of the second set of CW signals:
      receiving a reflection of the CW signal, and
      selecting an analog to digital (A/D) sample of the reflection of the CW signal that does not contain ground reflections by selecting the A/D sample based on timing from the transmitter being turned off after transmission of the CW signal; and
   integrating the selected A/D samples from each of the CW signals of the of the second set of CW signals to obtain a single A/D sample for the second set of CW signals.

3. The method of claim 1, wherein the CW signals in the first set of CW signals are transmitted and corresponding reflections are sampled in a series of gating cycles of a first frequency window.

4. The method of claim 1, wherein sample timing for the selecting the A/D sample of the reflection of the CW signal comprises shifting a phase of a clock signal for an A/D converter to permit sub-sample timing resolution.

5. The method of claim 1, wherein the timing is based on a time delay.

6. The method of claim 5, wherein the time delay is based on estimating a distance of a GPR head from a ground.

7. The method of claim 5, wherein the time delay is determined by:
   receiving an un-gated return signal;
   identifying a ground reflection within the un-gated return signal; and
   adjusting the time delay based on the identified ground reflection.

8. The method of claim 1, wherein a sample rate of the A/D samples is one giga-samples per second (1 Gsps).

9. The method of claim 1, further comprising for each CW signal of the first set of CW signals, switching a receiver off during transmission of the CW signal.

10. A method for gating continuous wave (CW) signals of a stepped frequency continuous wave (SFCW) ground penetrating radar (GPR), the method comprising:
    obtaining a first set of analog to digital (A/D) samples of a transmitted CW signal;
    obtaining a second set of A/D samples of reflections of the transmitted CW signal;
    determining, based on the first set of A/D samples, a time that transmission of the transmitted CW signal stops; and
    selecting, based on the time that transmission of the transmitted CW signal stops and a delay period, an A/D sample from the second set of A/D samples that does not contain ground reflections of the transmitted CW signal.

11. The method of claim 10, further comprising:
    determining, based on the first set of A/D samples, a second time that transmission of the transmitted CW signal stops;
    selecting, based on the second time that the transmission of the CW signal stops and the delay period, a second A/D sample from the second set of A/D samples that does not contain ground reflections of the transmitted CW signal; and
    integrating the A/D sample and the second A/D sample.

12. The method of claim 10, wherein the delay period is based on a distance of a GPR head from a ground.

13. The method of claim 10, wherein the A/D samples are obtained from a pipeline A/D converter.

14. The method of claim 10, wherein a sample rate of the A/D samples is one giga-sample per second (1 Gsps).

15. The method of claim 10, wherein the delay period is based on estimating a distance of a GPR head from a ground.

16. A ground penetrating radar (GPR) device comprising:
    an antenna configured to transmit and receive stepped frequency continuous wave (CW) radar signals;
    a pipeline analog to digital (A/D) converter; and
    an electronic processor coupled to an electronic storage, the electronic storage comprising instructions, that when executed, cause the processor to perform operations comprising:
       transmitting, by a transmitter, a first set of continuous wave (CW) radar signals, each CW radar signal of the first set of CW radar signals having a first signal frequency, and the transmitter being turned off between transition of each CW radar signal of the first set of CW radar signals;
       for each CW radar signal of the first set of CW radar signals:
          receiving a reflection of the CW radar signal, and
          selecting an analog to digital (A/D) sample of the reflection of the CW radar signal that does not contain ground reflections by selecting the A/D sample based on timing from the transmitter being turned off after transmission of the CW radar signal; and
       integrating the selected A/D samples from each of the CW radar signals of the of the first set of CW radar signals to obtain a single A/D sample for the first set of CW radar signals.

17. The device of claim 16, wherein the operations further comprise:
- transmitting, by the transmitter, a second set of CW signals, each CW radar signal of the second set of CW signals having a second signal frequency different from the first signal frequency, and the transmitter being turned off between transition of each CW signal of the second set of CW signals;
- for each CW signal of the second set of CW signals:
  - receiving a reflection of the CW signal, and
  - selecting an analog to digital (A/D) sample of the reflection of the CW signal that does not contain ground reflections by selecting the A/D sample based on timing from the transmitter being turned off after transmission of the CW signal; and
- integrating the selected A/D samples from each of the CW signals of the of the second set of CW signals to obtain a single A/D sample for the second set of CW signals.

18. The device of claim 16, wherein the CW signals in the first set of CW signals are transmitted and corresponding reflections are sampled in a series of gating cycles of a first frequency window.

19. The device of claim 16, wherein sample timing for the selecting the A/D sample of the reflection of the CW signal comprises shifting a phase of a clock signal for an A/D converter to permit sub-sample timing resolution.

20. The device of claim 16, wherein the timing is based on estimating a distance of a GPR head from a ground.

* * * * *